(12) United States Patent
Hawkes et al.

(10) Patent No.: US 11,917,396 B2
(45) Date of Patent: Feb. 27, 2024

(54) LOCAL AREA NETWORK (LAN) DEVICE PRIVACY

(71) Applicant: QUALCOMM Incorporated, San Diego, CA (US)

(72) Inventors: Philip Michael Hawkes, Valley Heights (AU); George Cherian, San Diego, CA (US); Sai Yiu Duncan Ho, San Diego, CA (US); Jouni Kalevi Malinen, Tuusula (FI)

(73) Assignee: QUALCOMM Incorporated, San Diego, CA (US)

( * ) Notice: Subject to any disclaimer, the term of this patent is extended or adjusted under 35 U.S.C. 154(b) by 281 days.

(21) Appl. No.: 17/454,326

(22) Filed: Nov. 10, 2021

(65) Prior Publication Data

US 2023/0140991 A1 May 11, 2023

(51) Int. Cl.
*H04W 12/02* (2009.01)
*H04L 61/50* (2022.01)
*H04W 84/12* (2009.01)
*H04L 101/622* (2022.01)

(52) U.S. Cl.
CPC ............ *H04W 12/02* (2013.01); *H04L 61/50* (2022.05); *H04L 2101/622* (2022.05); *H04W 84/12* (2013.01)

(58) Field of Classification Search
CPC ...... H04W 12/02; H04W 84/12; H04L 61/50; H04L 2101/622
See application file for complete search history.

(56) References Cited

U.S. PATENT DOCUMENTS

| 2007/0177549 | A1* | 8/2007 | Lo | ........... H04W 36/0058 370/331 |
| 2013/0044754 | A1* | 2/2013 | Zhu | ........... H04L 61/103 370/392 |
| 2014/0241267 | A1* | 8/2014 | Cherian | ........... H04W 12/069 370/329 |
| 2021/0314292 | A1* | 10/2021 | Seok | ........... H04W 76/15 |

* cited by examiner

*Primary Examiner* — Duc C Ho
(74) *Attorney, Agent, or Firm* — Patterson & Sheridan LLP

(57) ABSTRACT

Aspects of the present disclosure relate to wireless communications, and more particularly, to techniques for increasing local area network (LAN) device privacy. One aspect provides a method for wireless communications at an access point (AP). The method generally includes: determining a mapping between a first distribution system (DS) medium access control (MAC) address and a second DS MAC address; obtaining, from a source access terminal, a frame having the second DS MAC address; and sending at least a portion of the frame to a target access terminal based on the mapping between the first MAC address and the second MAC address.

20 Claims, 13 Drawing Sheets

---

900

910
DETERMINE A MAPPING BETWEEN A FIRST DISTRIBUTION SYSTEM (DS) MEDIUM ACCESS CONTROL (MAC) ADDRESS AND A SECOND DS MAC ADDRESS

920
OBTAIN, FROM A SOURCE DEVICE, A FRAME HAVING THE SECOND DS MAC ADDRESS

930
SEND AT LEAST A PORTION OF THE FRAME TO A TARGET DEVICE BASED ON THE MAPPING BETWEEN THE FIRST MAC ADDRESS AND THE SECOND MAC ADDRESS

US 11,917,396 B2

LOCAL AREA NETWORK (LAN) DEVICE PRIVACY

INTRODUCTION

Aspects of the present disclosure relate to wireless communications, and more particularly, to techniques for increasing local area network (LAN) device privacy.

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has emerged as a popular technique for communication systems. MIMO technology has been adopted in several wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

SUMMARY

Aspects of the present disclosure relate to wireless communications, and more particularly, to techniques for increasing local area network (LAN) device privacy.

One aspect provides a method for wireless communications at an access point (AP). The method generally includes: determining a mapping between a first distribution system (DS) medium access control (MAC) address and a second DS MAC address; obtaining, from a source access terminal, a frame having the second DS MAC address; and sending at least a portion of the frame to a target access terminal based on the mapping between the first MAC address and the second MAC address.

One aspect provides a method for wireless communications at a source access terminal. The method generally includes: determining a mapping between a first DS MAC address and a second DS MAC address; identifying the first DS MAC address as being associated with a target access terminal; generating a frame having the second DS MAC address in response to the identification and based on the mapping between the first DS MAC address and the second DS MAC address; and sending the frame to the target access terminal.

One aspect provides a method for wireless communications at a target access terminal. The method generally includes: determining a mapping between a first DS MAC address and a second DS MAC address; obtaining a frame having the second DS MAC address; identifying a source access terminal associated with the frame based on the mapping between the first DS MAC address and the second DS MAC address; and processing the frame based on the identification.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
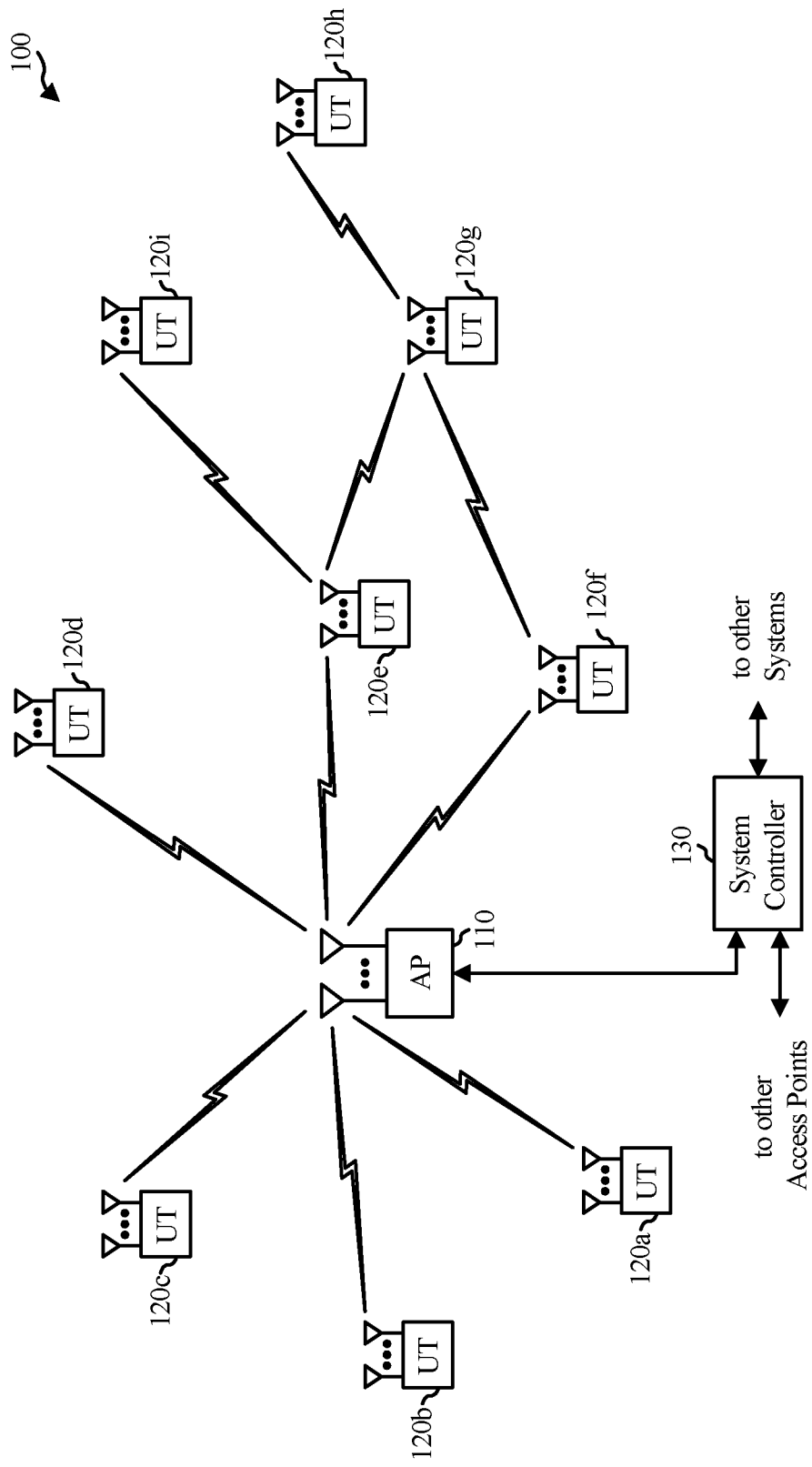
FIG. 1 is a diagram of an example wireless communications network, in accordance with certain aspects of the present disclosure.

Aspects of the present disclosure provide apparatuses, methods, processing systems, and computer-readable mediums for facilitating privacy when communicating using a local area network (LAN). For example, a distribution system (DS) medium access control (MAC) address of device in the DS may be hidden by using a pseudonym DS MAC address. In other words, when a STA transmits a frame that would otherwise include a DS MAC address, the STA would instead transmit a frame having a pseudonym DS MAC address. In some aspects, an access point (AP) may indicate the mapping between the actual DS MAC address and its pseudonym to the STA, allowing the STA to generate a frame having the pseudonym DS MAC address using the mapping.

In other aspects, an address resolution protocol (ARP) message that would otherwise indicate a DS MAC address and is destined to the STA may be intercepted by an AP. The AP may replace the DS MAC address with its pseudonym before forwarding the ARP message to the STA, such that the STA uses the pseudonym DS MAC address when communicating a frame. The aspects described herein facilitate hiding of a DS MAC address, preventing eavesdroppers from detecting and using the DS MAC address to determine information about devices in the DS.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each subcarrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), next generation Node B (gNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

An Example Wireless Communication System

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 (also referred to herein as stations (STAs)) at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer or future user terminals being implemented with technology such as SDMA, OFDM or OFDMA to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
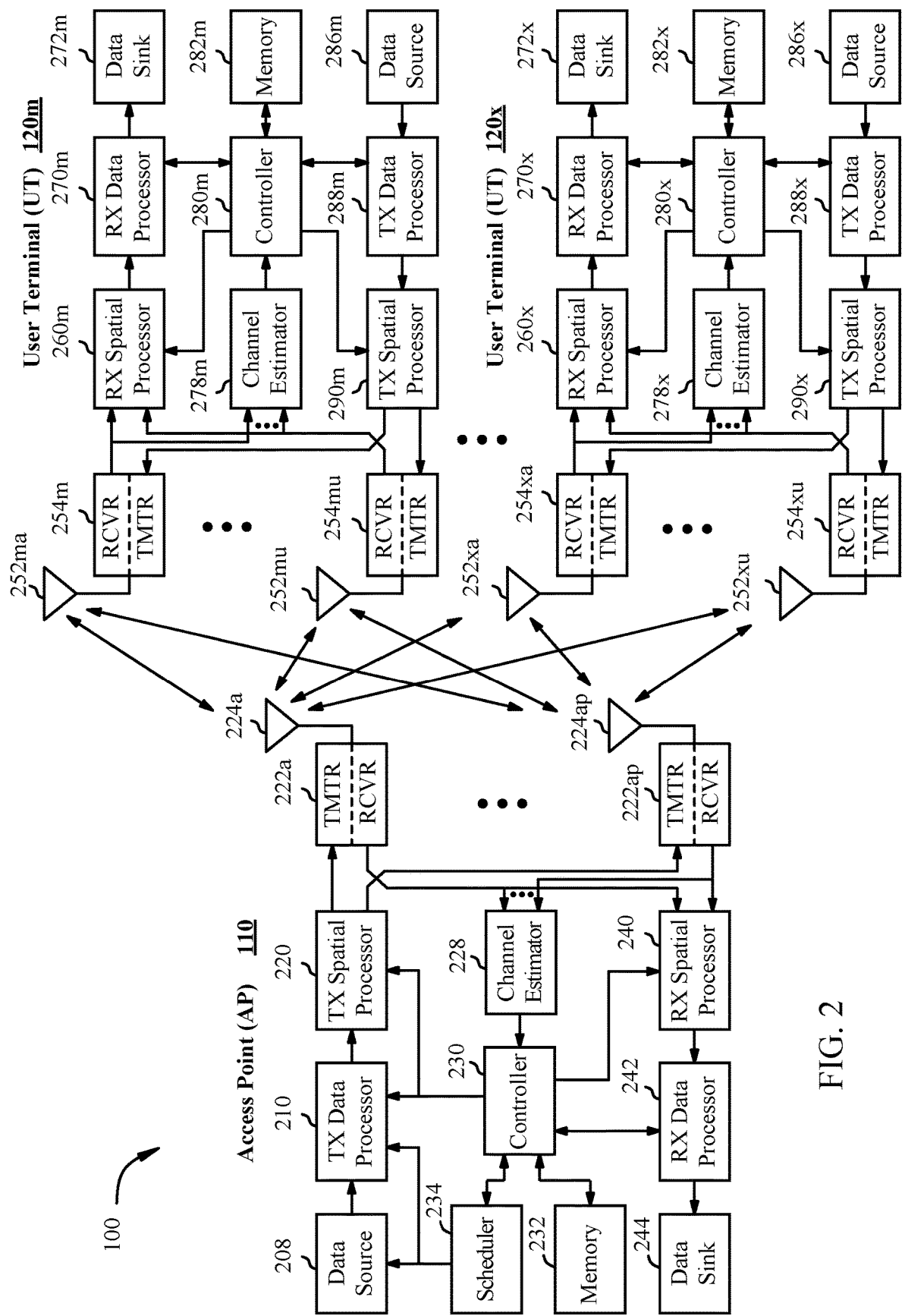
FIG. 2 is a block diagram of an example access point and example user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
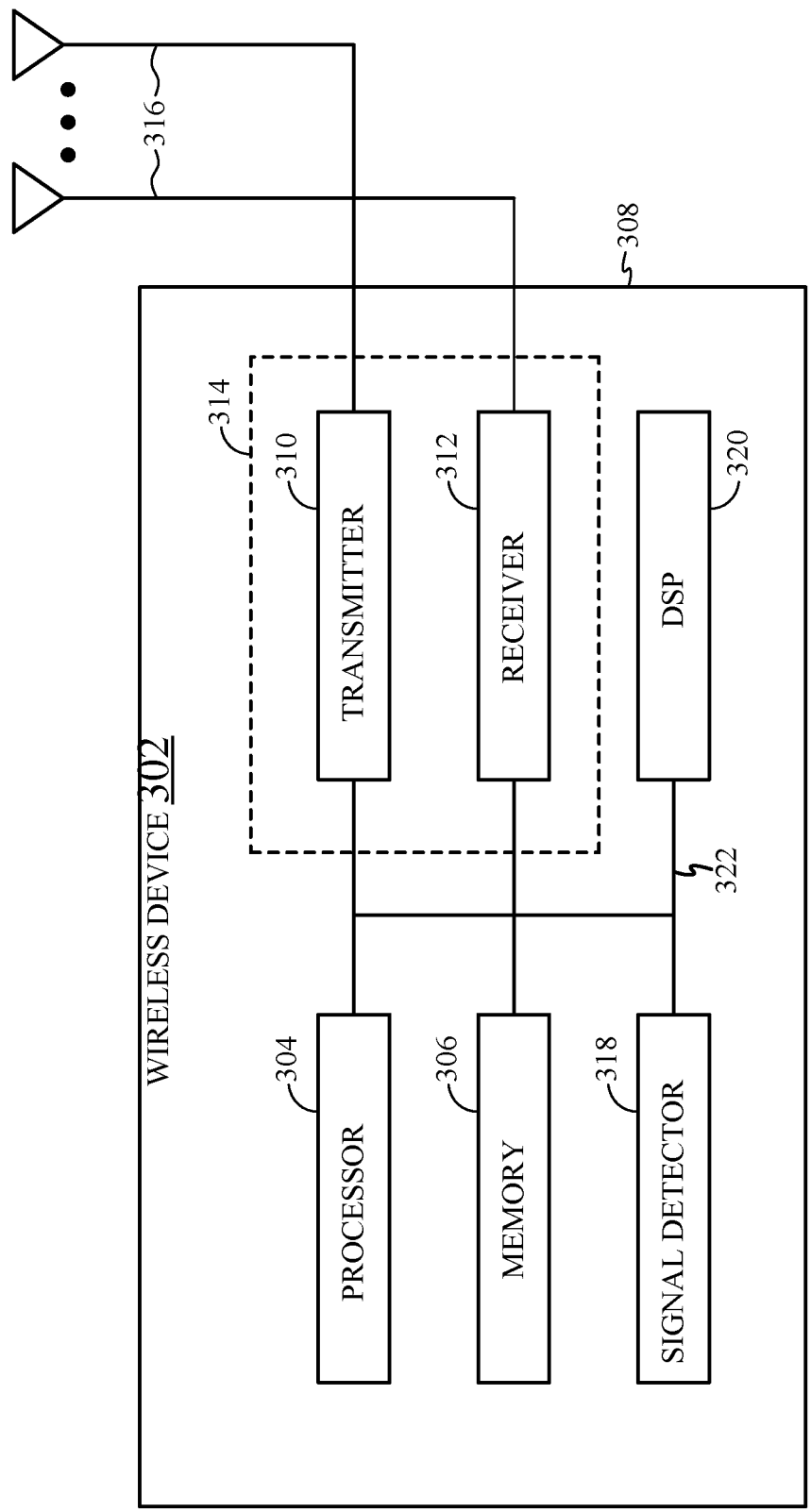
FIG. 3 is a diagram illustrating a wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Introduction of LAN Device Privacy Concerns

FIGS. 4A, 4B, 4C, and 4D illustrate communication of medium access control (MAC) addresses in a wireless communication system 400 between STAs through a Distribution System (DS). A DS is an infrastructure of interconnecting access points (APs) in a local area network (LAN).

For source/destination wired devices in the DS, each wired device uses a permanent ethernet MAC address assigned by a manufacturer, which may be assumed to be hidden on the wired network in the DS. A MAC address includes an organizationally unique identifier (OUI) which may be derived from publicly-available OUI databases. OUI can be used to determine information about wired devices on the network, such as identification of expensive devices that owners would rather other people did not know about for privacy reasons. For example, thieves may perform a drive-by scan of frames which may be used to extract MAC addresses and check OUI to identify the best houses to break into. Privacy and blackmail are other concerns and reasons why it is important to facilitate the privacy of device addresses.

Figure 4A:
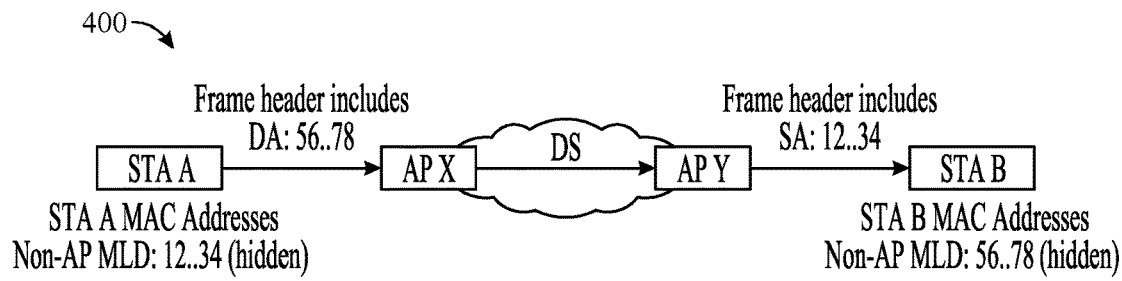
FIGS. 4A, 4B, 4C, and 4D illustrate communication of medium access control (MAC) addresses in a wireless communication system between stations through a Distribution System (DS).

As shown in FIG. 4A, a multi-link operation (MLO) architecture may be implemented, and STA-to-STA communication may be supported via a DS (e.g., for wireless printers, peer-to-peer applications, etc.). Some networks block STA-to-STA communication (e.g., public networks), while others allow STA-to-STA communication (e.g., such as private and enterprise networks). Both STA A and STA B may be non-AP multi-link devices (MLDs). Non-AP MLD MAC addresses are used as the DS MAC addresses for the STAs.

In some scenarios, STA A sends an ARP request to determine the non-AP MLD MAC address of STA B. STA A transmits a frame including a destination address (DA) containing the non-AP MLD MAC address of STA B. AP X receives the frame and routes to AP Y to which STA B is connected. In some cases, a single AP may be used for both STAs. In other words, AP X and AP Y may be the same AP. AP Y transmits a frame including the source address (SA) containing the non-AP MLD MAC address of STA B. Thus, the non-AP MLD MAC address transmission may be prone to scanning by a third party, causing a privacy concern.

Figure 4B:
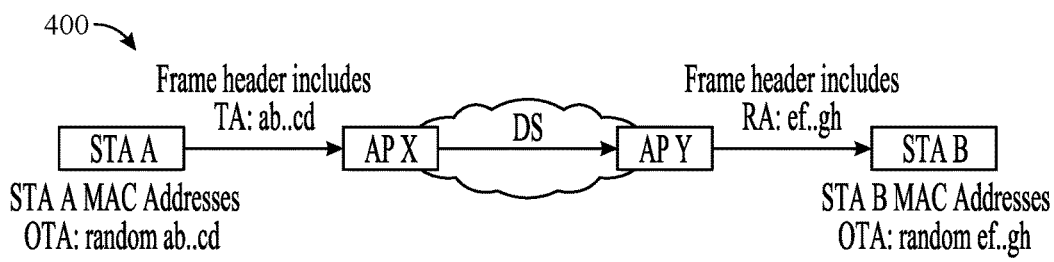

As shown in FIG. 4B, a transmitter address (TA) may be selected and transmitted by STA A and a receiver address (RA) may be transmitted by APY. Users may change over-the-air (OTA) MAC addresses frequently (e.g., for privacy reasons). For higher-layer continuity reasons, STAs may change non-AP MLD MAC addresses infrequently. The non-AP MLD MAC addresses may also be used as the DS MAC address, in some instances. Thus, eavesdroppers should be prevented from determining OTA MAC addresses (e.g., sent at different times) corresponding to a STA, which would allow the eavesdroppers to determine the mapping from OTA MAC addresses to the longer lived non-AP MLD MAC address, posing a privacy concern.

Figure 4C:
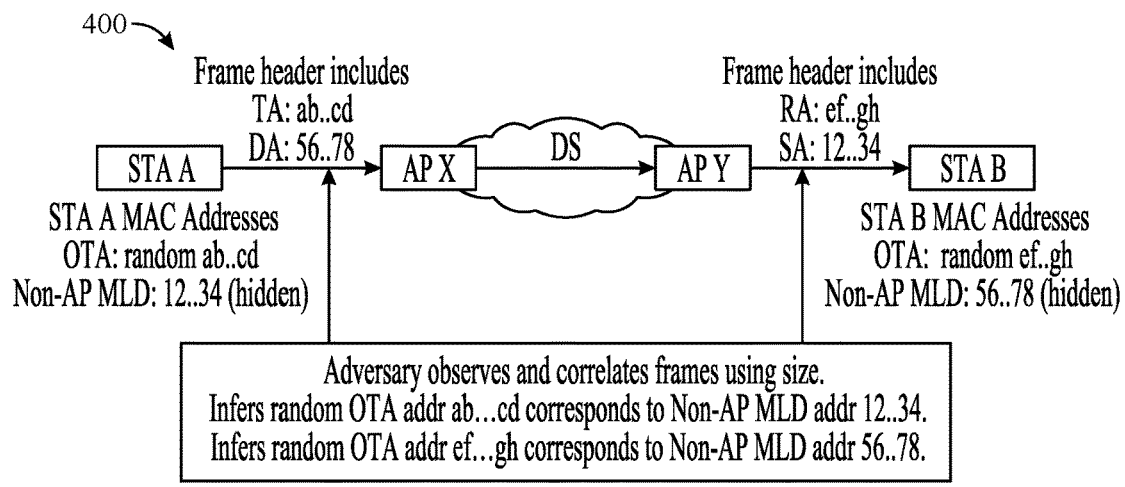
Figure 4D:
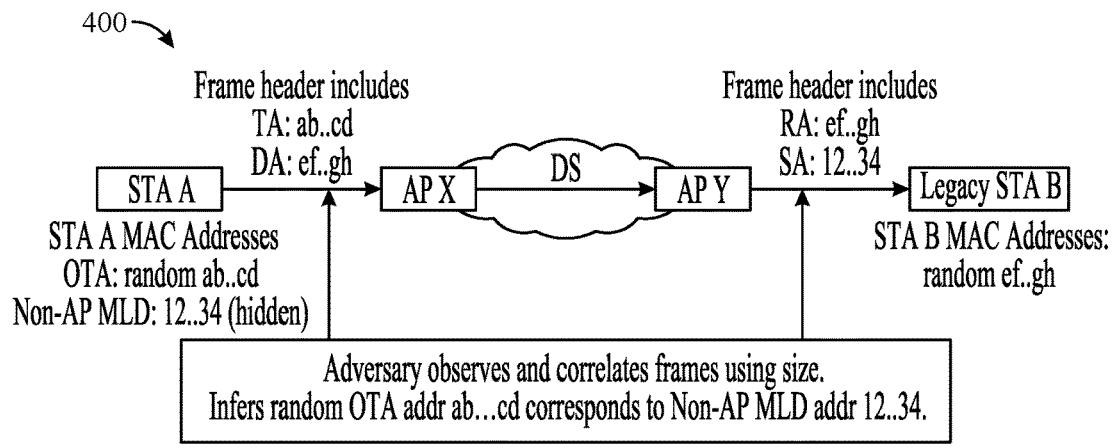

As shown in FIGS. 4C and 4D, random MAC addresses may be used to facilitate privacy. However, the frame payload TXed by STA A may be the same frame payload TXed by AP Y (e.g., having the same size). An adversary observing frames TXed in the extended service set (ESS) can determine the two transmissions are of a single frame by observing and correlating frames using their size. From the two transmissions of a single frame, the adversary infers the mapping between a random OTA address and non-AP MLD MAC addresses for both STAs. This compromises the reason for using random OTA MAC addresses. In other words, the eavesdropper may infer that that the random OTA address (ab . . . cd) of STA A corresponds to the non-AP MLD address (12 . . . 34) of STA due to the transmission by APY including, in the SA field, the non-AP MLD address (12 . . . 34) of STA A. Thus, sending SA/DA in the clear compromises/nullifies privacy mitigations for other STAs.

As shown in FIG. 4D, STA B may be a legacy STA. However, in this case, the frame payload TXed by STA A may still be the same frame payload TXed by AP Y (e.g., having the same size). An adversary observing frames Txed in the ESS can determine the two transmissions are of the same frame. From the two transmissions of a single frame, the adversary infers the mapping between random OTA and non-AP MLD MAC addresses for STA B. In other words, the eavesdropper can still infer that the random OTA address (ab . . . cd) of STA A corresponds to the non-AP MLD address (12 . . . 34) of STA A based on the SA being included in the transmission by AP Y to the legacy STA B. This compromises the reason for using random OTA MAC addresses. Thus, sending SA/DA in the clear compromises/nullifies privacy mitigations for other STAs.

In some cases, SA/DA may not be sent in the clear, and may instead be sent encrypted OTA. However, this does not solve all problems. Even if STA A encrypts SA/DA, it does not help it hide STA A's MAC address in the DS since it is the transmission from AP Y to STA B that reveals STA A's MAC address in the DS and STA A cannot influence whether this is encrypted or not. Thus, a single STA not encrypting SA/DA can reveal MAC addresses of every device in the DS. This solution's effectiveness will decrease as the impact on STA implementations increases. Moreover, encrypting SA/DA introduces hardware changes, and vendors will be slow to include these features. A legacy STA cannot easily be updated to encrypt SA/DA, and some legacy STAs may never be updated. Therefore, what is needed is a privacy solution with little impact on STA implementation and which hides the MAC addresses of all devices in the DS.

Aspects Related to Increasing Privacy in a Local Area Network (LAN)

Certain aspects of the present disclosure are directed to techniques for facilitating user privacy concerning wireless communication using a local area network (LAN). For example, when transmitted frames have a source/destination in the Distribution System (DS) other than the frame transmitter/receiver, then the source/destination medium access control (MAC) address (SA/DA) is sent in the clear over-the-air (OTA). As used herein, a device's DS MAC address generally refers to an address used inside the DS to identify the device for routing frames. A source/destination device may be a wired device (e.g., using Ethernet) or a station (STA) communicating wirelessly. Sending SA/DA in the clear OTA may have some privacy implications. For source/destination wired devices in the DS, the DS MAC address is permanent and includes an organizationally unique identifier (OUI) which can be used to identify expensive devices (e.g., TVs), posing a risk with regards to theft and safety. For source/destination STAs, the DS MAC address may be sent as SA or DA in OTA frames. This allows tracking of users around the DS even as OTA MAC addresses are frequently changing.

In some aspects of the present disclosure, an AP creates a pseudonym address (M') for each MAC address (M) in a DS. Both the STA and the AP use M' in SA/DA of frames where M would otherwise have been used. The AP translates M to M' before transmission (TX) on downlink and translates M' to M on reception (RX) on uplink.

Some aspects of the present disclosure involve the implementation of actions at a STA. For example, the AP may securely send to a STA the mapping from M to M'. Thus, the STA knows DS MAC address M of the target device and translates M to M' before TX on uplink, and translates M' to M on RX on downlink.

Some aspects of the present disclosure do not involve the implementation of actions at a STA. For example, the AP may intercept address resolution protocol (ARP) messages to/from the STA and replace the M by M' in those messages. ARP is a procedure for mapping a dynamic Internet Protocol address (IP address) to a permanent physical machine address in a local area network (LAN). The physical machine address is also known as a MAC address. The STA uses M' as the DS MAC address of the target device because the STA assumes that M' is the DS MAC address of the target device and the STA is not aware of M due to the ARP intercept by the AP.

Some aspects of the present disclosure may involve the implementation of operations at an AP. The AP creates a mapping from each DS MAC address M in the DS to an independent pseudonym DS MAC address M'. In some aspects, each time a STA associates, the AP may generate a new independent M to M' mapping to use for SA/DA in frames exchanged during that association. However, other options are possible. For example, the AP may generate a single mapping for each STA which is used across all associations of that STA. The AP may generate a single mapping which is used for all STAs that associate to that AP. Moreover, more than one AP may share the same mapping. Both the STA and AP use M' in SA/DA where M would otherwise have been used.

FIG. 5, FIG. 6, FIG. 7 and FIG. 8 are call flow diagrams illustrating operations 500, 600, 700 and 800 respectively for implementing privacy measures for a LAN, in accordance with certain aspects of the present disclosure. FIG. 5 and FIG. 6, FIG. 7 and FIG. 8 show three components in a LAN: AP(s) 502; a device 504; and a device 506. As shown, at block 508, a STA (e.g., the device 504, the device 506, or both) may associate with an AP (e.g., one of AP(s) 502). The AP(s) 502 may include two APs in a DS (e.g., AP X and AP Y as described with respect to FIGS. 4A-4D), where each of the device 504 and the device 506 associates with a respective one of the APs. In some aspects, the AP(s) may be a single AP with which both the device 504 and the device 506 are associated with.

In some aspects, the device 504 is a STA wireless communicating with the AP(s) 502 or a wired device connected to the AP(s) 502 in the DS. Similarly, the device 506 may be a STA wireless communicating with the AP(s) 502 or a wired device connected to the AP(s) 502 in the DS.

In certain aspects, for each connected STA, an AP creates a mapping from each DS MAC address M in the DS to an independent pseudonym DS MAC address M' that is used with that STA, noting that any number of STA may share a common mapping. At block 510, the AP(s) securely sends to each associated STA (e.g., device 504, device 506, or both) the mapping from each DS MAC address M to a corresponding pseudonym DS MAC address M' used for that STA.

In some aspects, a STA (e.g., the device 504) may initiate ARP, at block 512, to obtain DS MAC address of a target device (e.g., device 506) in the DS. For example, the device 504 may transmit an ARP request to the device 506 (e.g., through the APs 502), and receive an ARP response indicating the DS MAC address associated with the IP address of device 506.

The STA (e.g., device 504) associates the DS MAC address (M_device2) of device 406 with the IP address of device 506. Both the STA(s) and AP(s) use M' in SA/DA where M would otherwise have been used. For example, M_device2' (e.g., pseudonym of M_device2) may be used as the destination address (DA) in frames destined to device 506 as a target device.

Figure 5:
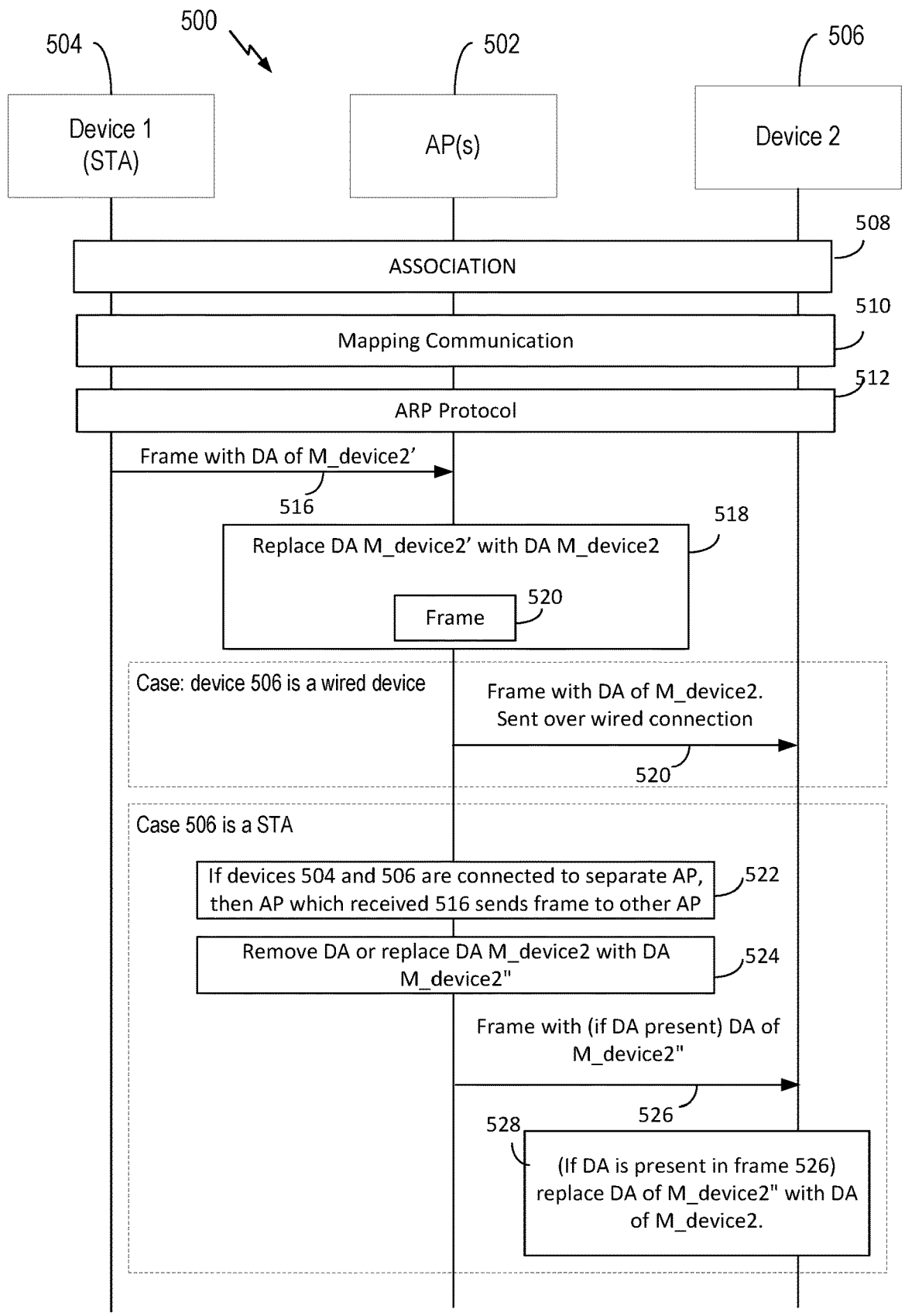
FIG. 5 is a call flow diagram illustrating operations for implementing privacy measures for a local area network (LAN), in accordance with certain aspects of the present disclosure.

FIG. 5 illustrates some aspects of the present disclosure relate to a STA sourced frame destined to a target device (e.g., where the device 504 is a source device configured as a STA and device 506 is the target device). In such as a scenario, the STA (e.g., device 504) generates a frame 516 indicating a DA of M_device2 it has associated with the target device's IP address. To facilitate privacy of the DS MAC address of device 506, the STA may replace the DA of M_device2 in the frame 516 to be sent with a DA of M_device2', M_device2' being a pseudonym address mapped to M_device2 (e.g., based on the mapping indicated at block 510). The STA then transmits the frame 516 (including M_device2') on uplink. Thus, the DA of M_device2' is transmitted in the clear, facilitating privacy for M_device2.

The AP receives the frame 516 on uplink. At block 518, the AP generates frame 520 by replacing DA of M_device2' with DA of M_device2 in accordance with the configured mapping to identify the destination of the frame 520. The AP may also add an SA of M_device1 (e.g., address of device 504 configured as a STA in this scenario) to frame 520. The subsequent steps depend on whether the device 506 is a wired device in the DS, or another STA wirelessly communicating with an AP.

If the device 506 is a wired device, then the AP forwards the frame 520 to device 506 over the DS (e.g., using a wired link if the device 506 is connected to the associated AP in the DS using a wired link). The device 506 processes the frame 520 accordingly based on SA of M_device1 and DA of M_device2.

If the device 506 is another STA, then the AP to which device 504 is connected is hereafter denoted as the receiving AP and the AP to which device 506 is connected is hereafter denoted the transmitting AP. In some aspects, the receiving AP is also the transmitting AP. In other aspects, the receiving AP is separate from the transmitting AP. In the latter case, the AP 502 which received frame 516 from device 504 forwards the frame 520 to the transmitting AP to which device 506 is connected. Otherwise, the remaining steps are independent of whether device 504 and device 506 are connected to a single AP 502 or distinct APs 502.

At block 524, the transmitting AP 502 generates frame 526 based on frame 520. At block 524, the transmitting AP 502 generates frame 526 by replacing DA of M_device2 in frame 520 with DA of M_device2" in accordance with a configured mapping provided to device 506. The mapping provided to device 504 may differ from the mapping configured to device 506. Consequently, frame 516 (transmitted from device 504 to AP 502) may use a pseudonym M_device2' for M_device2 (according to the mapping configured to device 504), while frame 526 (transmitted from AP 502 to device 506) may use a different pseudonym M_device2" for M_device2 (according to the mapping configured to device 506). In some aspects, at block 524, the transmitting AP 502 generates frame 526 by removing DA from frame 520. Consequently, if frame 526 includes a DA, then frame 526 may include DA of M_device2". The frame 526 is sent to device 506. At block 528, the device 506 generates a frame (for internal processing) based on the received frame 526. If DA is present in frame 526, then operations at block 528 may include the device 506 replacing DA of M_device2" in frame 526 with DA of M_device2 in accordance with a configured mapping provided to device 506, and processes the resultant frame accordingly.

Figure 6:
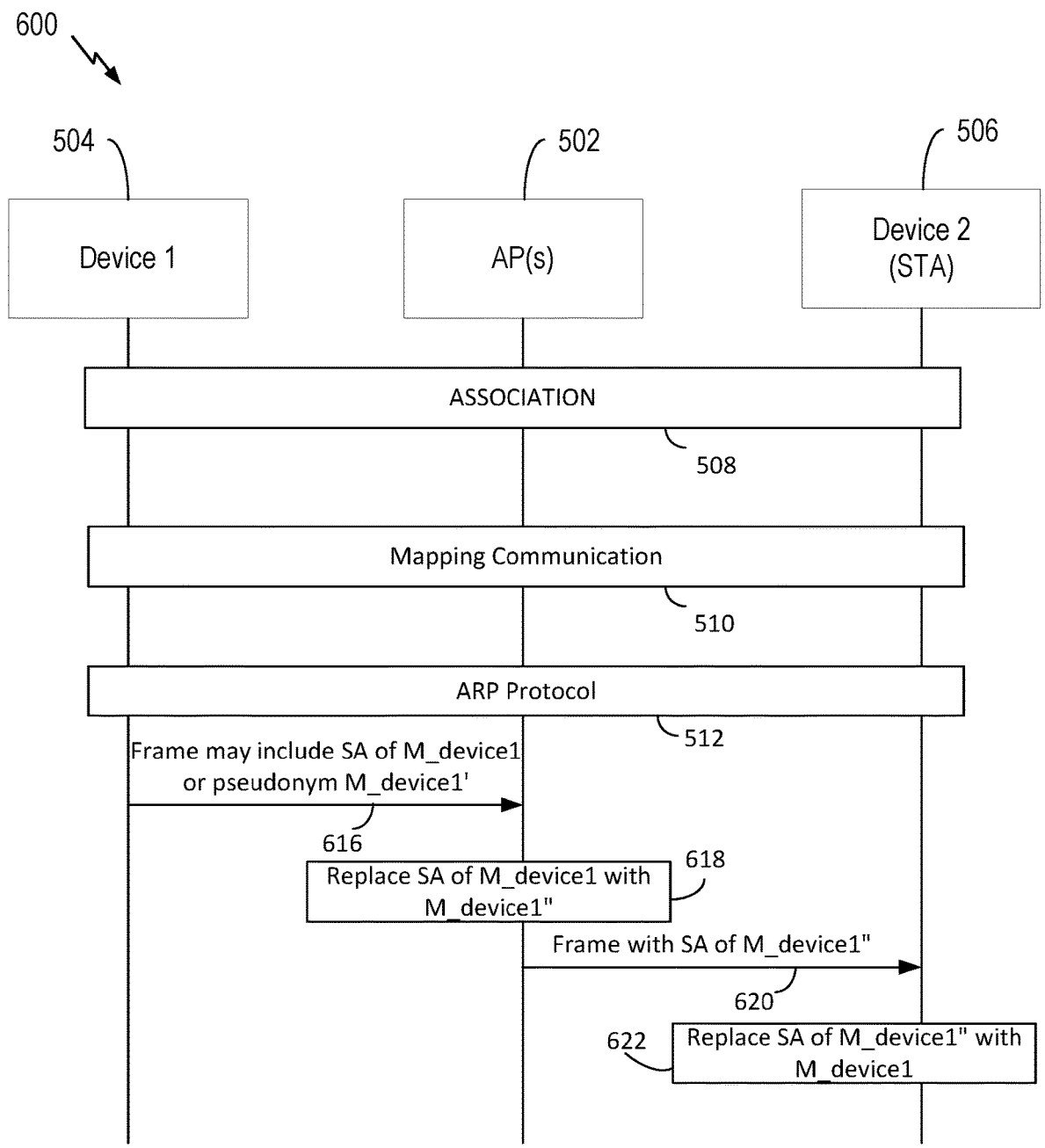
FIG. 6 illustrates example techniques for facilitating privacy when communicating a frame destined to a station, in accordance with certain aspects of the present disclosure.

FIG. 6 illustrates example operations 600 for facilitating privacy when communicating a frame destined to a STA. In other words, device 504 may be a source device, and device 506 may be a target device configured as a STA. The AP (to which device 506 is associated) obtains a frame 616 destined to device 506, where device 504 is the source of the frame 616. The AP may receive the frame 616 over DS (e.g., via a wired link) with a SA of M_device1.

In some cases, the AP may receive frame 616 over a wireless connection, in which case, the frame 616 may not include an SA. In this case, the AP determines SA according to existing procedures and adds the SA of M_device1 to generate frame 620.

In some aspects, the AP may receive frame 616 over a wireless connection, and frame 616 may include an SA containing M_device1' (pseudonym of M_device1), based on the mapping provided to device 504. In this case, the AP determines the SA according to the determined mapping (e.g., as provided to device 504) and replaces the pseudonym M_device1' with M_device1 to generate frame 620. In some aspects, the AP may receive frame 616 over a wireless connection, the frame 616 including an SA of M_device1 of device 504.

As shown, the AP may replace, at block 618, the SA of M_device1 with SA of M_device1" according to the mapping provided to device 506 to generate frame 620. The mapping provided to device 504 may differ from the mapping configured to device 506. Consequently, frame 616 (transmitted from device 504 to APs 502) may use a pseudonym M_device1' for M_device1 (according to the mapping configured to device 504), while frame 620 (transmitted from APs 502 to device 506) may use a different pseudonym M_device1" for M_device1 (according to the mapping configured to device 506). The AP transmits frame 620 on downlink where the SA of M_device1" is transmitted in the clear. The STA (e.g., device 506) receives the frame 620 on downlink, and at block 622, replaces SA of M_device1" with SA of M_device1 based on the indicated mapping. The STA associates frame 620 with the IP address of device 504 (e.g., using the SA of M_device1) and processes the frame 620 accordingly. The aspects described with respect to FIGS. 5 and 6 allow a STA to maintain a target device's DS MAC address across changes to the target device's pseudonym MAC address, and thus, provides higher layer continuity.

Figure 7:
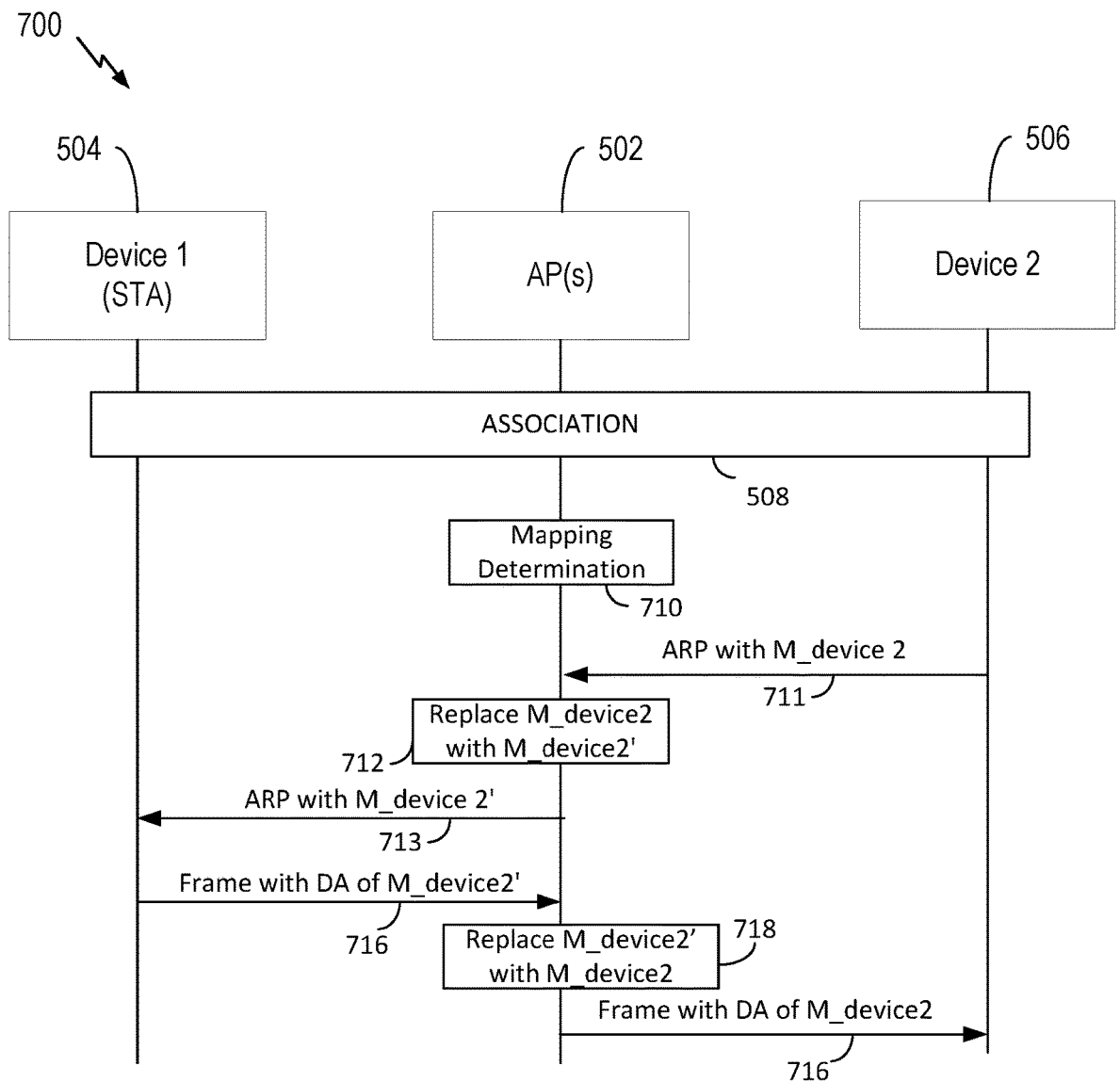
FIG. 7 is a call flow diagram illustrating operations for implementing privacy measures for a LAN, in accordance with certain aspects of the present disclosure.

FIG. 7 is a call flow diagram illustrating operations 700 for implementing privacy measures for a LAN, in accordance with certain aspects of the present disclosure. The AP(s) 502 support proxy ARP. One or more of devices 504, 506 may be a STA. As described herein, each STA associates with an AP, at block 508.

In some aspects, at block 710, the AP creates a mapping from each registered DS MAC address M to an independent pseudonym DS MAC address M'. A STA initiates ARP to obtain DS MAC address of a target device. For example, the STA (e.g., device 504) may receive an ARP message 711 from the target device (e.g., device 506), with AP(s) 502 serving as proxy for communicating the ARP message. At block 712, the AP(s) 502 intercepts the ARP message and replaces DS MAC address (e.g., M_device2) in the response with a pseudonym DS MAC address (e.g., M_device2'). The ARP message 713 having the pseudonym DS MAC address (e.g., M_device2') is sent to the device 504. The STA associates the target device's pseudonym DS MAC address (e.g., M_device2') with the target device's IP address. Both the STA and AP use M' in SA/DA where M would otherwise have been used.

As shown, the frame 716 may be a STA sourced frame destined for a target device. For example, a STA (e.g., device 504) may generate a frame 716 with DA of the target device (e.g., device 506) using the indicated pseudonym (M_device2') the STA has associated with the target device's IP address. The STA transmits the frame 716 on uplink. The DA of M_device2' is transmitted in the clear. The AP receives the frame 716 on uplink, and at block 718, replaces DA of M_device2' with DA of M_device2. The AP also adds the SA of M_STA (e.g., address of device 504), and forwards the frame 716 to the destination (device 506) over the DS, and device 506 processes the frame accordingly.

Figure 8:
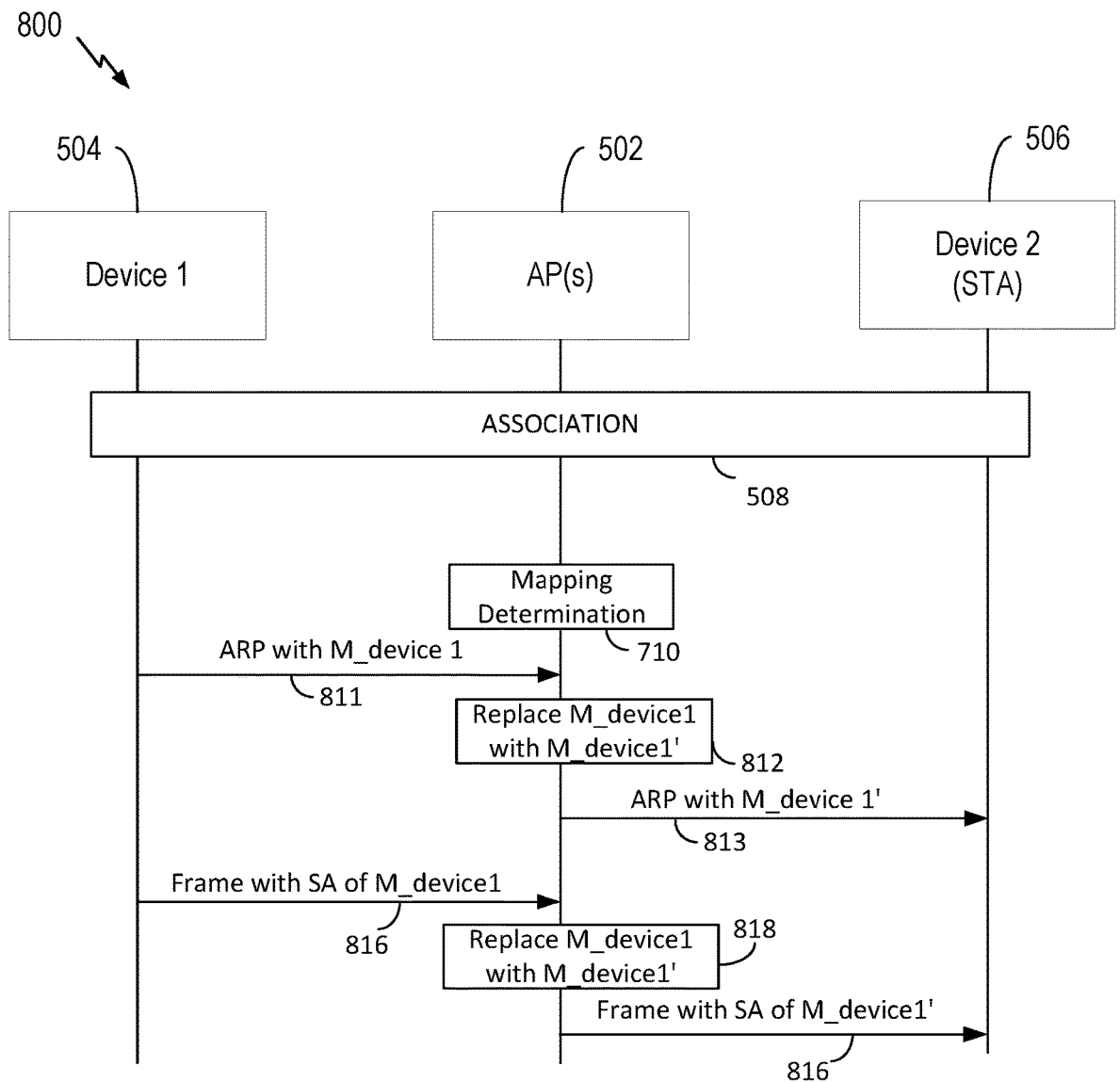
FIG. 8 illustrates example techniques for facilitating privacy when communicating a frame destined to a station, in accordance with certain aspects of the present disclosure.

FIG. 8 illustrates example operations 800 for facilitating privacy when communicating a frame destined to a STA. In other words, device 504 may be a source device and device 506 may be a target device configured as a STA. The device 504 may send an ARP message 811 with M_device1. The ARP message is intercepted by the AP, and at block 812, M_device1 is replaced with M_device1'. The ARP message 813 having M_device1' is then sent to device2 506.

As shown, the AP receives a frame 816 over DS with SA of M_device1 and DA of M_STA (e.g., address of device 506 configured as a STA). The AP removes the DA of M_STA, and at block 818, replaces the SA of M_device1 with an SA of M_device1' in the frame 816. The AP transmits the frame 816 on downlink to device 506. The SA of M_device1 ' is transmitted in the clear. The STA (device 506) receives the frame 816 on downlink and associates the frame 816 having M_device1' with the IP address of device 504 since the ARP message 813 included M_device1'.

The aspects described herein facilitate hiding of DS MAC addresses, allowing the DS MAC addresses to be changed frequently. The aspects described with respect to FIGS. 7 and 8 do not involve any changes to the STA. The aspects described with respect to FIGS. 7 and 8 are implemented with an AP intercepting ARP, and thus, has a greater impact on AP implementation although most APs already support proxy ARP.

Figure 9:
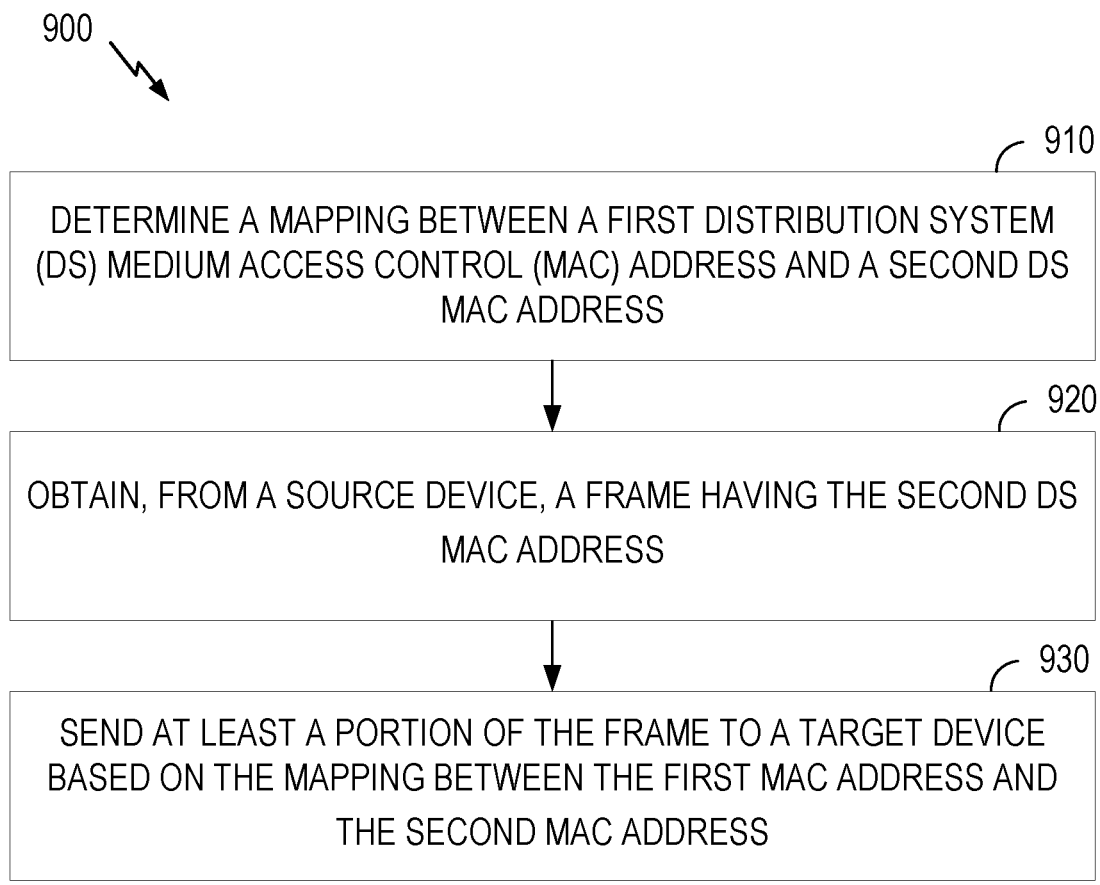
FIG. 9 is a flow diagram illustrating example operations for wireless communication by an access point, in accordance with certain aspects of the present disclosure.

FIG. 9 is a flow diagram illustrating example operations 900 for wireless communication. The operations 1100 may be performed, for example, by an AP (e.g., such as the AP 110 of FIG. 1). The operations 900 may be implemented as software components that are executed and run on one or more processors (e.g., controller 230 of FIG. 2). Further, the transmission and reception of signals by the AP in operations 900 may be enabled, for example, by one or more antennas (e.g., antennas 224 of FIG. 2). In certain aspects, the transmission and/or reception of signals by the BS may be implemented via a bus interface of one or more processors (e.g., controller 230) obtaining and/or outputting signals.

The operations 900 begin, at block 910, with the AP determining a mapping between a first DS MAC address and a second DS MAC address. In some aspects, the AP may send an indication of the mapping to a source device or a target device.

At block 920, the AP obtains, from the source device, a frame having the second DS MAC address. At block 930, the AP sends (e.g., via a wired link or outputs for transmission) at least a portion of the frame to the target device based on the mapping between the first DS MAC address and the second DS MAC address. In some aspects, the AP may select the target device based on the mapping between the first DS MAC address (e.g., M_device2) and the second DS MAC address (e.g., M_device2') in the frame.

In some aspects, the AP replaces the second DS MAC address in the frame with the first DS MAC address. Sending at least the portion of the frame may include sending the frame having the first DS MAC address. In some cases, the frame may be sourced from a STA, as described with respect to FIGS. 5 and 7. Thus, the second DS MAC address may be a pseudonym address (e.g., M_device2') associated with the first DS MAC address (e.g., M_device2), the first DS MAC address representing the target device. In some cases, the frame may destined to a STA as described with respect to FIGS. 6 and 8. Thus, the first DS MAC address (e.g., M_device1') may be a pseudonym address associated with the second DS MAC address (e.g., M_device1), the second DS MAC address representing the source device.

In some aspects, the AP may obtain an ARP message. The ARP message may include a specific DS MAC address associated with an IP address of one of the source device or the target device (e.g., the source device or the target device). The AP may replace the specific DS MAC address with a pseudonym DS MAC address, and forward the ARP message having the pseudonym DS MAC address to another one the source device or the target device (e.g., the target device or the source device). In some scenarios, the frame is sourced from a STA as described with respect to FIG. 7. Thus, the specific DS MAC address (e.g., M_device2) may be the first DS MAC address, and the pseudonym DS MAC address (e.g., M_device2') may be the second DS MAC address (e.g., included in the frame sourced by the STA). In some scenarios, the frame may be destined to a STA as described with respect to FIG. 8. Thus, the specific DS MAC address (e.g., M_device1) may be the second DS MAC address, and the pseudonym DS MAC address (e.g., M_device1') may be the first DS MAC address.

Figure 10:
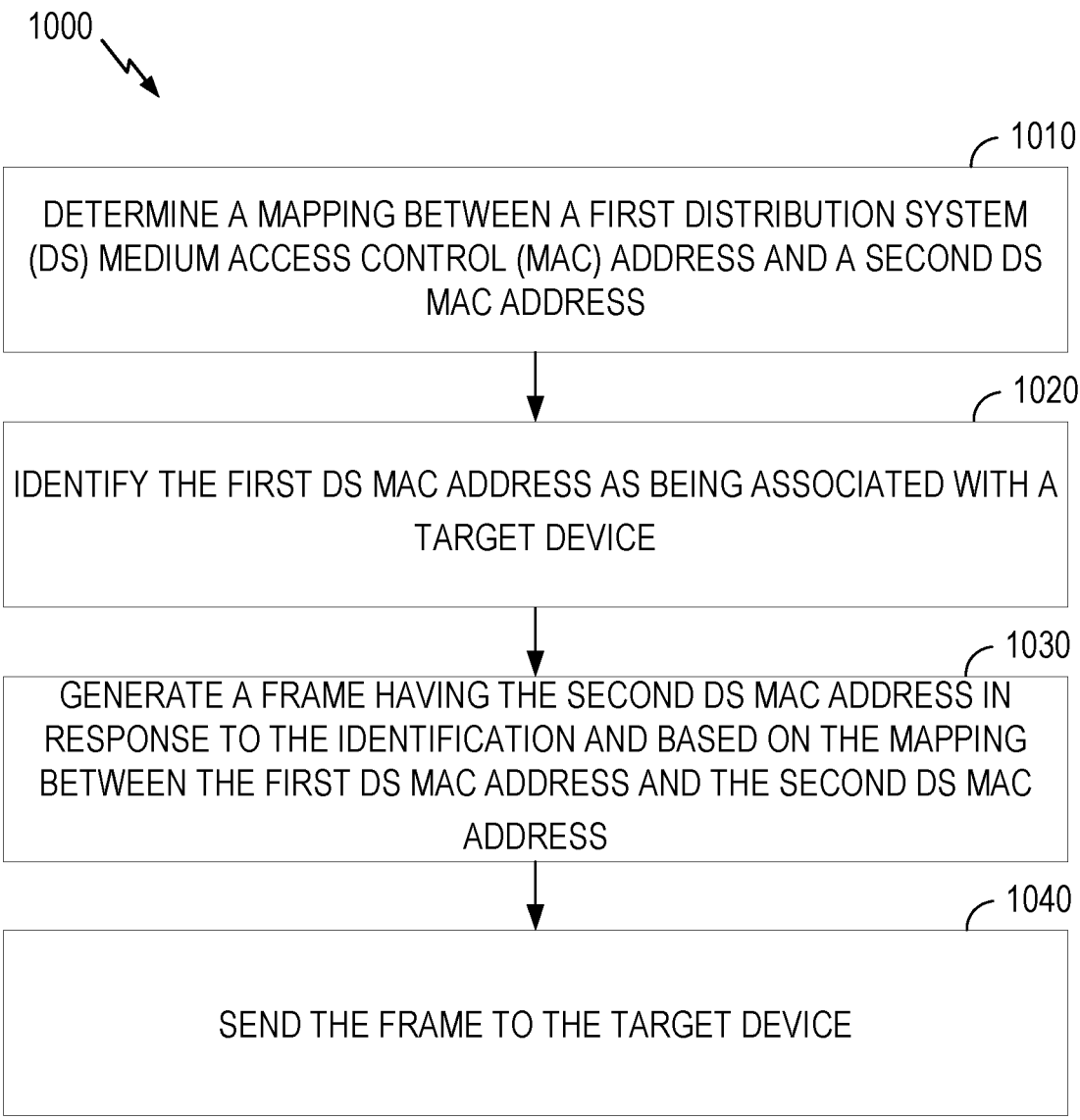
FIG. 10 is a flow diagram illustrating example operations for wireless communication by a source device, in accordance with certain aspects of the present disclosure.

FIG. 10 is a flow diagram illustrating example operations 1000 for wireless communication, in accordance with certain aspects of the present disclosure. The operations 1000 may be performed, for example, by a source device (e.g., STA such as the user terminal 120 of FIG. 1). The operations 1000 may be implemented as software components that are executed and run on one or more processors (e.g., controller 280 of FIG. 2). Further, the transmission and reception of signals by the source device in operations 1000 may be enabled, for example, by one or more antennas (e.g., antennas 252 of FIG. 2). In certain aspects, the transmission and/or reception of signals by the source device may be implemented via a bus interface of one or more processors (e.g., controller 280) obtaining and/or outputting signals.

The operations 1000 begin, at block 1010, with the source device determining a mapping between a first DS MAC address and a second DS MAC address. In some aspects, the source device obtains, from an AP, an indication of the mapping between the first DS MAC address and the second DS MAC address, wherein the mapping is determined based on the indication.

At block 1020, the source device identifies the first DS MAC address as being associated with a target device. For example, the source device may obtain an ARP message indicating that the first DS MAC address is associated with an IP address of the target device, where the identification of the first DS MAC address is based on the ARP message.

At block 1030, the source device generates a frame having the second DS MAC address in response to the identification and based on the mapping between the first DS MAC address and the second DS MAC address. The second DS MAC address (e.g., M_device2' shown in FIG. 5) may be a pseudonym address associated with the first DS MAC address, the first DS MAC address representing the target device.

At block 1040, the source device sends the frame to the target device. For example, the frame may be outputted for transmission to the target device (e.g., through one or more APs).

Figure 11:
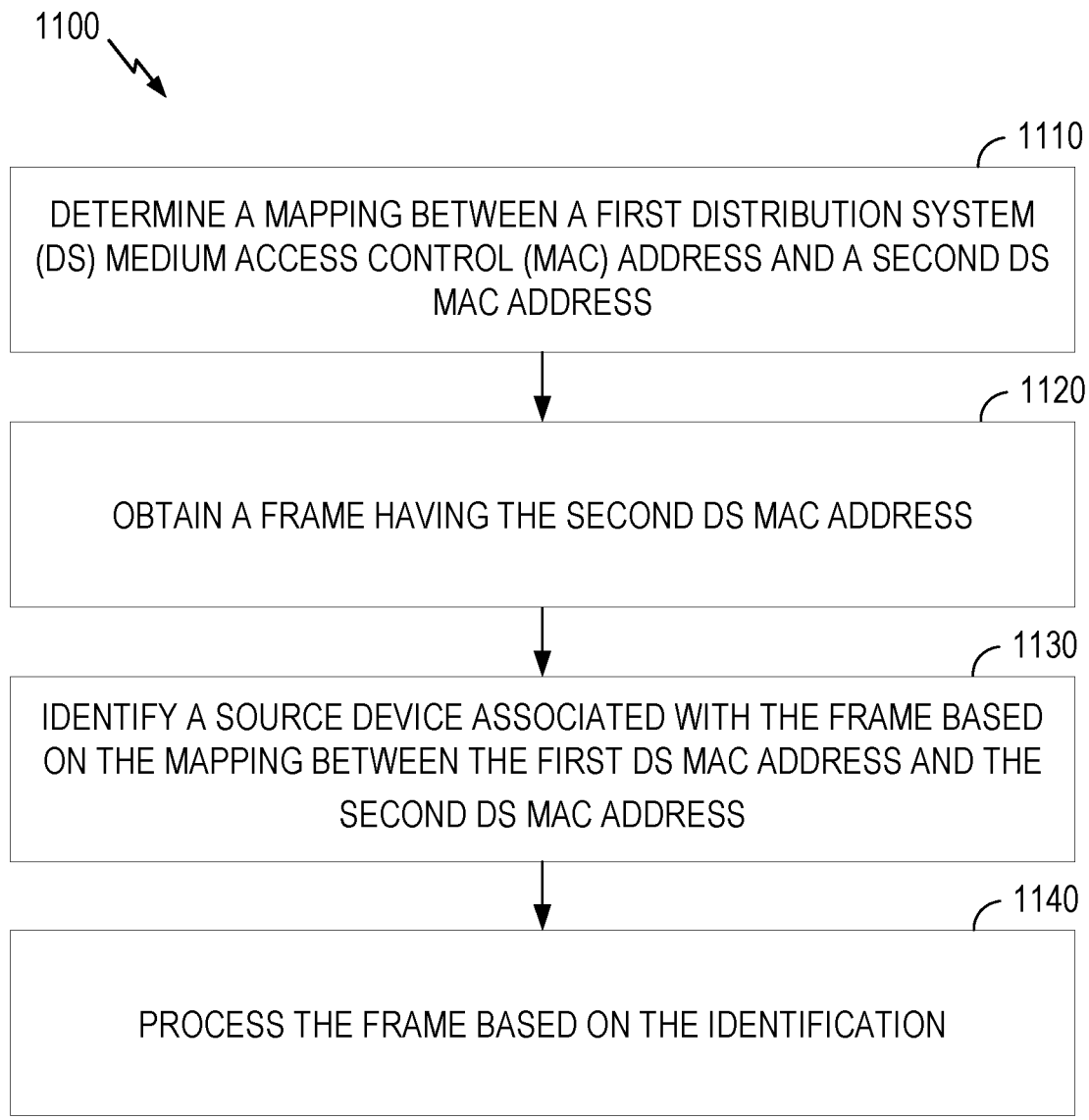
FIG. 11 is a flow diagram illustrating example operations for wireless communication by a target device, in accordance with certain aspects of the present disclosure.

FIG. 11 is a flow diagram illustrating example operations 1100 for wireless communication, in accordance with certain aspects of the present disclosure. The operations 1100 may be performed, for example, by a target device (e.g., STA such as the user terminal 120 of FIG. 1). The operations 1000 may be implemented as software components that are executed and run on one or more processors (e.g., controller 280 of FIG. 2). Further, the transmission and reception of signals by the target device in operations 1100 may be enabled, for example, by one or more antennas (e.g., antennas 252 of FIG. 2). In certain aspects, the transmission and/or reception of signals by the target device may be implemented via a bus interface of one or more processors (e.g., controller 280) obtaining and/or outputting signals.

The operations 1100 begin, at block 1110, with the target device determining a mapping between a first DS MAC address and a second DS MAC address. In some aspects, the target device obtains, from an AP, an indication of the mapping between the first DS MAC address and the second DS MAC address, where the mapping is determined based on the indication.

At block 1120, the target device obtains a frame having the second DS MAC address. At block 1130, the target device identifies a source device associated with the frame based on the mapping between the first DS MAC address and the second DS MAC address. For example, the target device may obtain an ARP message indicating that the first DS MAC address is associated with an IP address of the source device, where the identifying of the source device associated with the frame is further based on the ARP message. At block 1140, the target device processes the frame based on the identification.

Example Wireless Communication Devices

Figure 12:
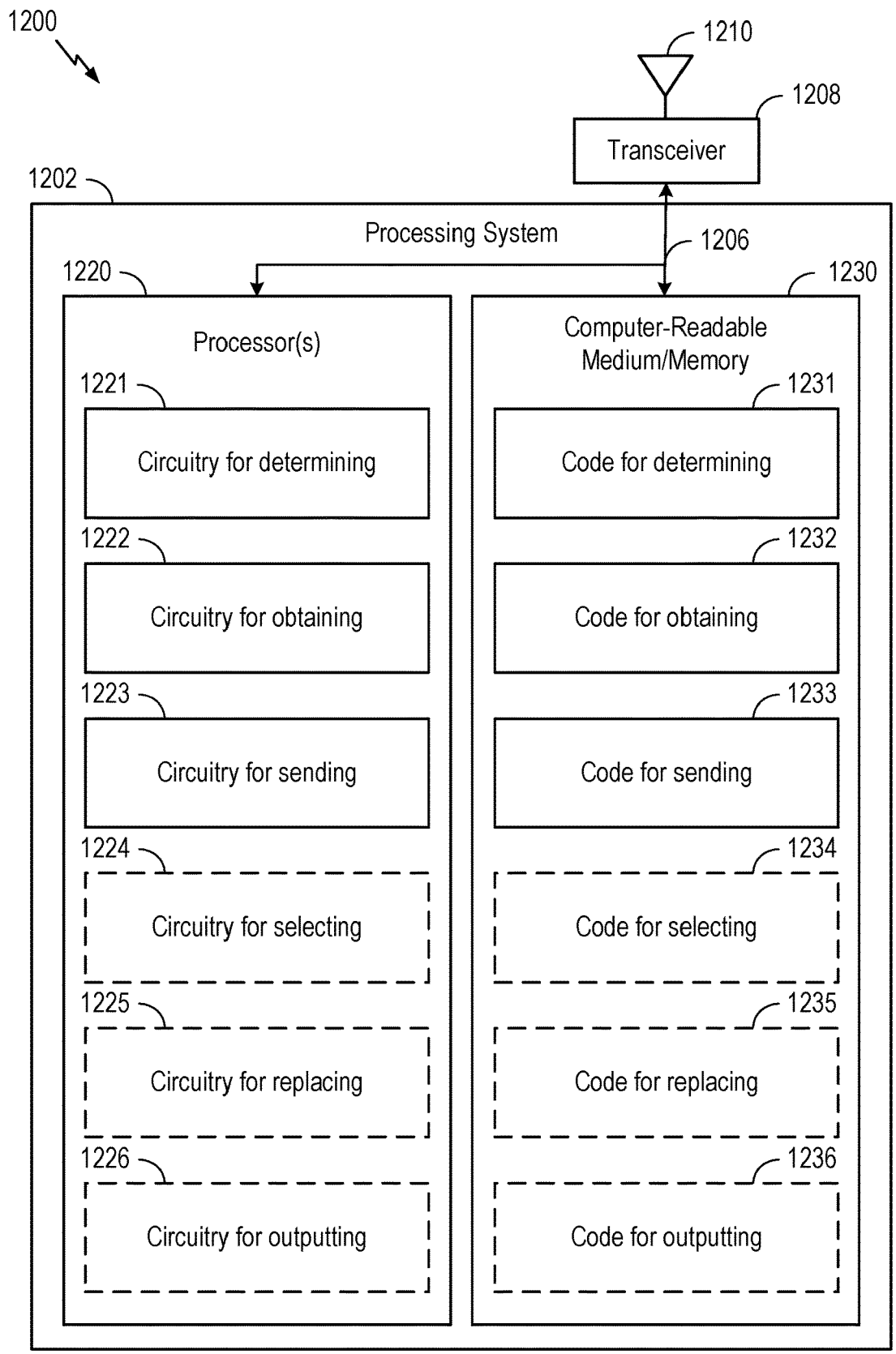
FIG. 12 depicts aspects of an example communications device.

FIG. 12 depicts an example communications device 1200 that includes various components operable, configured, or adapted to perform operations for the techniques disclosed herein, such as the operations depicted and described with respect to FIGS. 5-9. In some examples, communication device 1200 may be an AP 110 as described, for example with respect to FIGS. 1 and 2.

Communications device 1200 includes a processing system 1202 coupled to a transceiver 1208 (e.g., a transmitter and/or a receiver). Transceiver 1208 is configured to transmit (or send) and receive signals for the communications device 1200 via an antenna 1210, such as the various signals as described herein. Processing system 1202 may be configured to perform processing functions for communications device 1200, including processing signals received and/or to be transmitted by communications device 1200.

Processing system 1202 includes one or more processors 1220 coupled to a computer-readable medium/memory 1230 via a bus 1206. In certain aspects, computer-readable medium/memory 1230 is configured to store instructions (e.g., computer-executable code) that when executed by the one or more processors 1220, cause the one or more processors 1220 to perform the operations illustrated in FIGS. 5-9, or other operations for performing the various techniques discussed herein.

In the depicted example, computer-readable medium/memory 1230 stores code 1231 for determining, code 1232 for obtaining, code 1233 for sending (or forwarding), code 1234 for selecting, code 1235 for replacing, and code 1236 for outputting.

In the depicted example, the one or more processors 1220 include circuitry configured to implement the code stored in the computer-readable medium/memory 1230, including circuitry 1221 for determining, circuitry 1222 for obtaining, circuitry 1223 for sending, circuitry 1224 for selecting, circuitry 1225 for replacing, and circuitry 1226 for outputting.

Various components of communications device 1200 may provide means for performing the methods described herein, including with respect to FIGS. 5-9.

In some examples, means for transmitting or sending (or means for outputting for transmission) may include the transceivers 232 and/or antenna(s) 224 of the AP 110 illustrated in FIG. 2 and/or transceiver 1208 and antenna 1210 of the communication device 1200 in FIG. 12.

In some examples, means for receiving (or means for obtaining) may include the transceivers 232 and/or antenna(s) 224 of the AP illustrated in FIG. 2 and/or transceiver 1208 and antenna 1210 of the communication device 1200 in FIG. 12.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for determining, means for obtaining, means for sending, means for forwarding, means for selecting, means for replacing, and means for outputting may include various processing system components, such as: the one or more processors 1220 in FIG. 12, or aspects of the AP 110 depicted in FIG. 2, including receive processor 240, transmit processor 220, TX data processor 210, and/or controller 230.

Notably, FIG. 12 is an example, and many other examples and configurations of communication device 1200 are possible.

Figure 13:
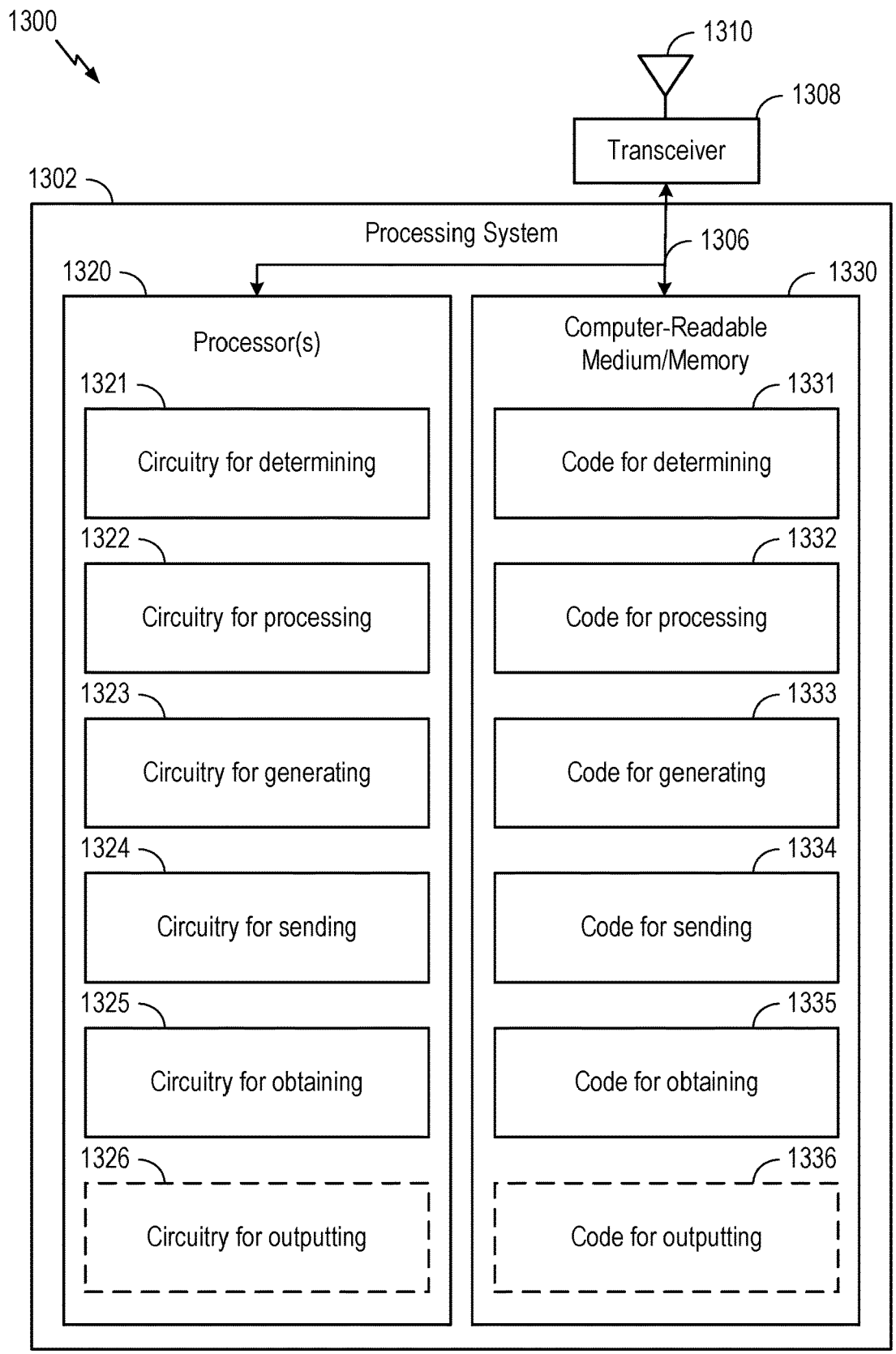
FIG. 13 depicts aspects of an example communications device.

FIG. 13 depicts an example communications device 1300 that includes various components operable, configured, or adapted to perform operations for the techniques disclosed herein, such as the operations depicted and described with respect to FIGS. 5-8 and 10-11. In some examples, communication device 1300 may be a user terminal 120 as described, for example with respect to FIGS. 1 and 2.

Communications device 1300 includes a processing system 1302 coupled to a transceiver 1308 (e.g., a transmitter and/or a receiver). Transceiver 1308 is configured to transmit (or send) and receive signals for the communications device 1300 via an antenna 1310, such as the various signals as described herein. Processing system 1302 may be configured to perform processing functions for communications device 1300, including processing signals received and/or to be transmitted by communications device 1300.

Processing system 1302 includes one or more processors 1320 coupled to a computer-readable medium/memory 1330 via a bus 1306. In certain aspects, computer-readable medium/memory 1330 is configured to store instructions (e.g., computer-executable code) that when executed by the one or more processors 1320, cause the one or more processors 1320 to perform the operations illustrated in FIGS. 5-8 and 10-11, or other operations for performing the various techniques discussed herein.

In the depicted example, computer-readable medium/memory 1330 stores code 1331 for determining (or identifying), code 1332 for processing, code 1333 for generating, code 1334 for sending, code 1335 for obtaining, and code 1336 for outputting.

In the depicted example, the one or more processors 1320 include circuitry configured to implement the code stored in the computer-readable medium/memory 1330, including circuitry 1321 for determining (or identifying), circuitry 1322 for processing, circuitry 1323 for generating, circuitry 1324 for sending, circuitry 1325 for obtaining, and circuitry 1326 for outputting.

Various components of communications device 1300 may provide means for performing the methods described herein, including with respect to FIGS. 5-8 and 10-11.

In some examples, means for transmitting or sending (or means for outputting for transmission) may include the transceivers 254 and/or antenna(s) 252 of the user equipment 104 illustrated in FIG. 2 and/or transceiver 1308 and antenna 1310 of the communication device 1300 in FIG. 13.

In some examples, means for receiving (or means for obtaining) may include the transceivers 254 and/or antenna(s) 252 of the user terminal 120 illustrated in FIG. 2 and/or transceiver 1308 and antenna 1310 of the communication device 1300 in FIG. 13.

In some examples, means for determining (or identifying), means for processing, means for generating, means for sending, means for obtaining, and means for outputting may include various processing system components, such as: the one or more processors 1320 in FIG. 13, or aspects of the user terminal 120 depicted in FIG. 2, including receive processor 260, transmit processor 290, TX data processor 288, and/or controller 280.

Notably, FIG. 13 is an example, and many other examples and configurations of communication device 1300 are possible.

Example Aspects

Implementation examples are described in the following numbered aspects:

Aspect 1: A method for wireless communications at an access point (AP), comprises: determining a mapping between a first distribution system (DS) medium access control (MAC) address and a second DS MAC address; obtaining, from a source access terminal, a frame having the second DS MAC address; and sending at least a portion of the frame to a target access terminal based on the mapping between the first MAC address and the second MAC address.

Aspect 2: The method of Aspect 1, further comprising selecting the target access terminal based on the mapping between the first DS MAC address and the second DS MAC address.

Aspect 3: The method of any one of Aspects 1-2, further comprising replacing the second DS MAC address in the frame with the first DS MAC address, wherein sending at least the portion of the frame comprises sending the frame having the first DS MAC address.

Aspect 4: The method of Aspect 3, wherein the second DS MAC address comprises a pseudonym address associated with the first DS MAC address, the first DS MAC address representing the target access terminal.

Aspect 5: The method of Aspect 3, wherein the first DS MAC address comprises a pseudonym address associated with the second DS MAC address, the second DS MAC address representing the source access terminal.

Aspect 6: The method of any one of Aspects 1-5, further comprising: obtaining an address resolution protocol (ARP) message, the ARP message having a specific DS MAC address associated with an internet protocol (IP) address of one of the source access terminal or the target access terminal; replacing the specific DS MAC address with a pseudonym DS MAC address; and forwarding the ARP message having the pseudonym DS MAC address to another one of the source access terminal or the target access terminal.

Aspect 7: The method of Aspect 6, wherein the specific DS MAC address comprises the first DS MAC address, and wherein the pseudonym DS MAC address comprises the second DS MAC address.

Aspect 8: The method of Aspect 6, wherein the specific DS MAC address comprises the second DS MAC address, and wherein the pseudonym DS MAC address comprises the first DS MAC address.

Aspect 9: The method of any one of Aspects 1-8, wherein the target access terminal comprises a station, and wherein sending at least the portion of the frame comprises outputting to at least the portion of the frame for transmission to the target access terminal.

Aspect 10: The method of any one of Aspects 1-9, further comprising sending an indication of the mapping to the source access terminal or the target access terminal.

Aspect 11: A method for wireless communications at a source access terminal, comprising: determining a mapping between a first distribution system (DS) medium access control (MAC) address and a second DS MAC address; identifying the first DS MAC address as being associated with a target access terminal; generating a frame having the second DS MAC address in response to the identification and based on the mapping between the first DS MAC address and the second DS MAC address; and sending the frame to the target access terminal.

Aspect 12: The method of Aspect 11, further comprising obtaining, from an access point (AP), an indication of the mapping between the first DS MAC address and the second DS MAC address, wherein the mapping is determined based on the indication.

Aspect 13: The method of any one of Aspects 11-12, further comprising obtaining an address resolution protocol (ARP) message indicating that the first DS MAC address is associated with an internet protocol (IP) address of the target access terminal, wherein the identification of the first DS MAC address is based on the ARP message.

Aspect 14: The method of any one of Aspects 11-13, wherein the sending the frame comprises outputting the frame for transmission to an AP.

Aspect 15: The method of any one of Aspects 11-14, wherein the second DS MAC address comprises a pseudonym address associated with the first DS MAC address, the first DS MAC address representing the target access terminal.

Aspect 16: A method for wireless communications at a target access terminal, comprising: determining a mapping between a first distribution system (DS) medium access control (MAC) address and a second DS MAC address; obtaining a frame having the second DS MAC address; identifying a source access terminal associated with the frame based on the mapping between the first DS MAC address and the second DS MAC address; and processing the frame based on the identification.

Aspect 17: The method of Aspect 16, further comprising obtaining, from an access point (AP), an indication of the mapping between the first DS MAC address and the second DS MAC address, wherein the mapping is determined based on the indication.

Aspect 18: The method of any one of Aspects 16-17, further comprising obtaining an address resolution protocol (ARP) message indicating that the first DS MAC address is associated with an internet protocol (IP) address of the source access terminal, wherein the identifying of the source access terminal associated with the frame is further based on the ARP message.

Aspect 19: An apparatus for wireless communications, comprising: a memory comprising instructions; and one or more processors configured to execute the instructions and cause the apparatus to perform a method in accordance with any one of Aspects 1-18.

Aspect 20: An access point (AP), comprising: at least one transceiver; a memory comprising instructions; and one or more processors configured to execute the instructions and cause the AP to perform a method in accordance with any one of Aspects 1-10, wherein the at least one transceiver is configured to receive the frame or transmit at least the portion of the frame.

Aspect 21: A source access terminal, comprising: at least one transceiver; a memory comprising instructions; and one or more processors configured to execute the instructions and cause the source access terminal to perform a method in accordance with any one of Aspects 11-15, wherein the at least one transceiver is configured to output the frame for transmission.

Aspect 22: A target access terminal, comprising: at least one transceiver; a memory comprising instructions; and one or more processors configured to execute the instructions and cause the target access terminal to perform a method in accordance with any one of Aspects 16-18, wherein the at least one transceiver is configured to receive the frame.

Aspect 23: An apparatus for wireless communications, comprising means for performing a method in accordance with any one of Aspects 1-18.

Aspect 24: A non-transitory computer-readable medium comprising instructions that, when executed by an apparatus, cause the apparatus to perform a method in accordance with any one of Aspects 1-18.

Additional Considerations

The preceding description provides examples of techniques for increasing local area network (LAN) device privacy in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communications at an access point (AP), comprises:
  a memory comprising instructions; and
  one or more processors configured to execute the instructions and cause the apparatus to:
    determine a mapping between a first distribution system (DS) medium access control (MAC) address and a second DS MAC address;
    obtain, from a source access terminal, a frame having the second DS MAC address; and
    send at least a portion of the frame to a target access terminal based on the mapping between the first MAC address and the second MAC address.

2. The apparatus of claim 1, wherein the one or more processors are further configured to cause the apparatus to select the target access terminal based on the mapping between the first DS MAC address and the second DS MAC address.

3. The apparatus of claim 1, wherein the one or more processors are further configured to cause the apparatus to replace the second DS MAC address in the frame with the first DS MAC address, wherein sending at least the portion of the frame comprises sending the frame having the first DS MAC address.

4. The apparatus of claim 3, wherein the second DS MAC address comprises a pseudonym address associated with the first DS MAC address, the first DS MAC address representing the target access terminal.

5. The apparatus of claim 3, wherein the first DS MAC address comprises a pseudonym address associated with the second DS MAC address, the second DS MAC address representing the source access terminal.

6. The apparatus of claim 1, wherein the one or more processors are further configured to cause the apparatus to:
obtain an address resolution protocol (ARP) message, the ARP message having a specific DS MAC address associated with an internet protocol (IP) address of one of the source access terminal or the target access terminal;
replace the specific DS MAC address with a pseudonym DS MAC address; and
forward the ARP message having the pseudonym DS MAC address to another one of the source access terminal or the target access terminal.

7. The apparatus of claim 6, wherein the specific DS MAC address comprises the first DS MAC address, and wherein the pseudonym DS MAC address comprises the second DS MAC address.

8. The apparatus of claim 6, wherein the specific DS MAC address comprises the second DS MAC address, and wherein the pseudonym DS MAC address comprises the first DS MAC address.

9. The apparatus of claim 1, wherein the target access terminal comprises a station, and wherein sending at least the portion of the frame comprises outputting to at least the portion of the frame for transmission to the target access terminal.

10. The apparatus of claim 1, wherein the one or more processors are further configured to cause the apparatus to send an indication of the mapping to the source access terminal or the target access terminal.

11. The apparatus of claim 1, further comprising at least one transceiver configured to receive the frame or transmit at least the portion of the frame, wherein the apparatus is configured as the AP.

12. An apparatus for wireless communications at a source access terminal, comprising:
a memory comprising instructions; and
one or more processors configured to execute the instructions and cause the apparatus to:
determine a mapping between a first distribution system (DS) medium access control (MAC) address and a second DS MAC address;
identify the first DS MAC address as being associated with a target access terminal;
generate a frame having the second DS MAC address in response to the identification and based on the mapping between the first DS MAC address and the second DS MAC address; and
send the frame to the target access terminal.

13. The apparatus of claim 12, wherein the one or more processors are further configured to cause the apparatus to obtain, from an access point (AP), an indication of the mapping between the first DS MAC address and the second DS MAC address, wherein the mapping is determined based on the indication.

14. The apparatus of claim 12, wherein the one or more processors are further configured to cause the apparatus to obtain an address resolution protocol (ARP) message indicating that the first DS MAC address is associated with an internet protocol (IP) address of the target access terminal, wherein the identification of the first DS MAC address is based on the ARP message.

15. The apparatus of claim 12, wherein the sending the frame comprises outputting the frame for transmission to an AP.

16. The apparatus of claim 12, wherein the second DS MAC address comprises a pseudonym address associated with the first DS MAC address, the first DS MAC address representing the target access terminal.

17. The apparatus of claim 12, further comprising at least one transceiver configured to transmit the frame, wherein the apparatus is configured as the source access terminal.

18. An apparatus for wireless communications at a target access terminal, comprising:
a memory comprising instructions; and
one or more processors configured to execute the instructions and cause the apparatus to:
determine a mapping between a first distribution system (DS) medium access control (MAC) address and a second DS MAC address;
obtain a frame having the second DS MAC address;
identify a source access terminal associated with the frame based on the mapping between the first DS MAC address and the second DS MAC address; and
process the frame based on the identification.

19. The apparatus of claim 18, wherein the one or more processors are further configured to cause the apparatus to obtain, from an access point (AP), an indication of the mapping between the first DS MAC address and the second DS MAC address, wherein the mapping is determined based on the indication.

20. The apparatus of claim 18, wherein the one or more processors are further configured to cause the apparatus to obtain an address resolution protocol (ARP) message indicating that the first DS MAC address is associated with an internet protocol (IP) address of the source access terminal, wherein the identifying of the source access terminal associated with the frame is further based on the ARP message.

* * * * *